May 31, 1955     W. V. BARRINGER     2,709,544
ROD AND REEL HOLDER
Filed Nov. 3, 1952     3 Sheets-Sheet 1
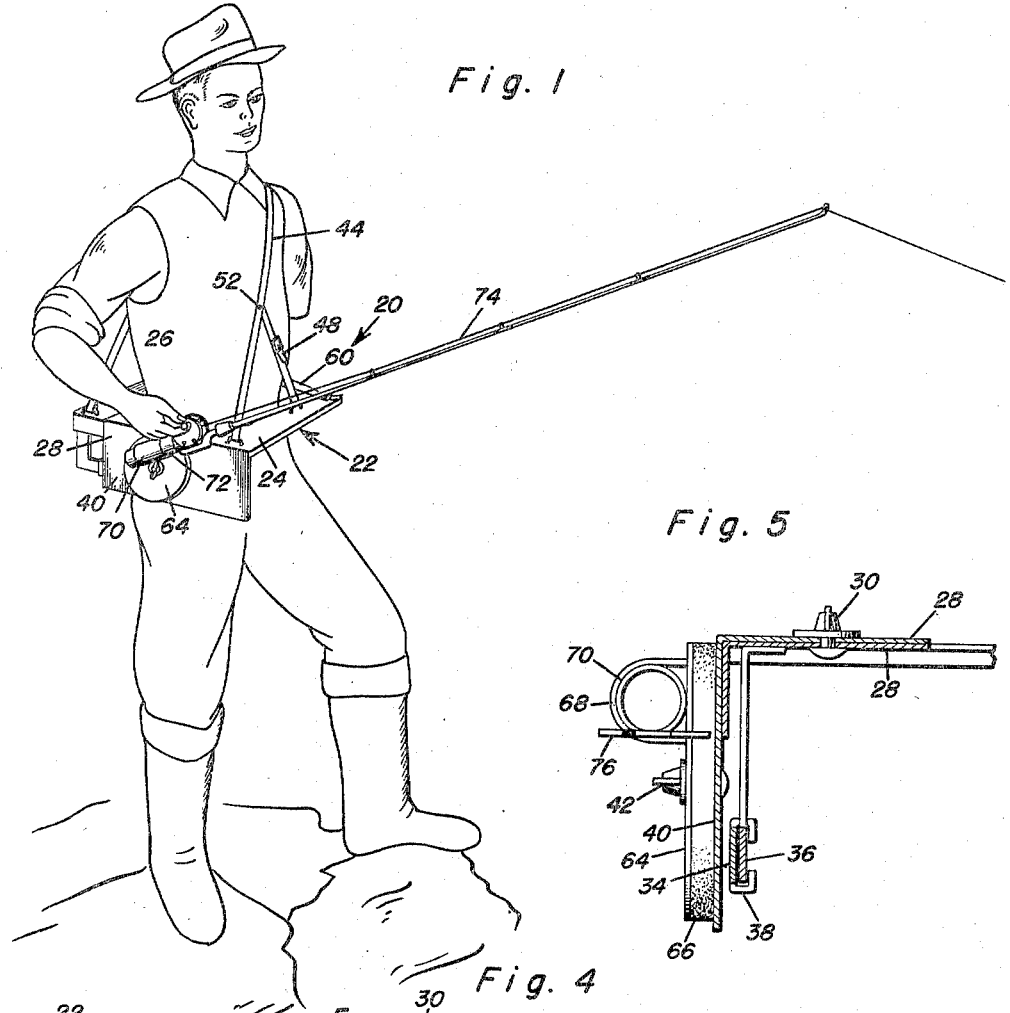
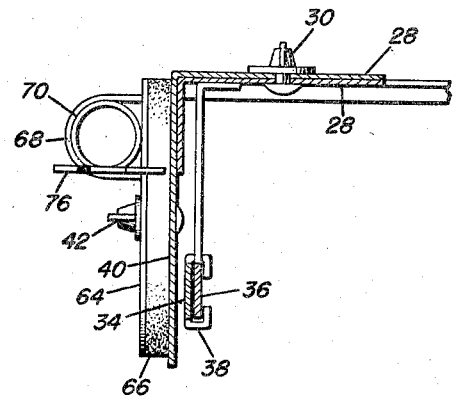
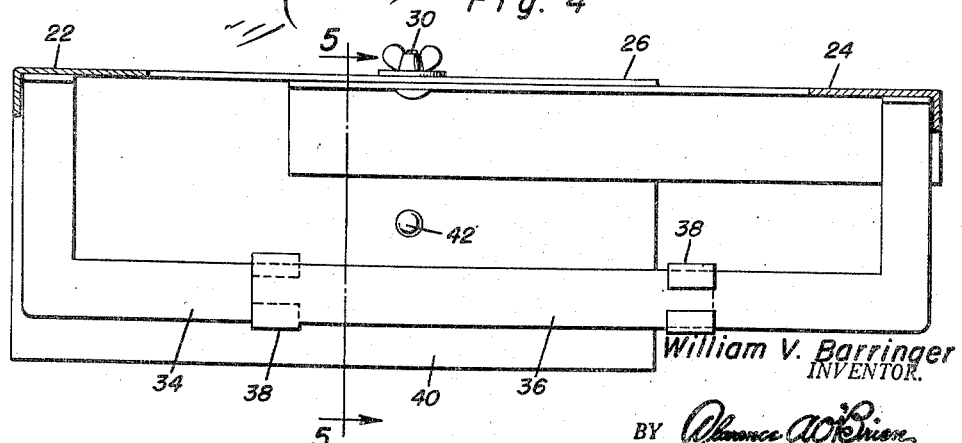
William V. Barringer
INVENTOR.

May 31, 1955            W. V. BARRINGER            2,709,544
ROD AND REEL HOLDER
Filed Nov. 3, 1952                                                  3 Sheets-Sheet 2
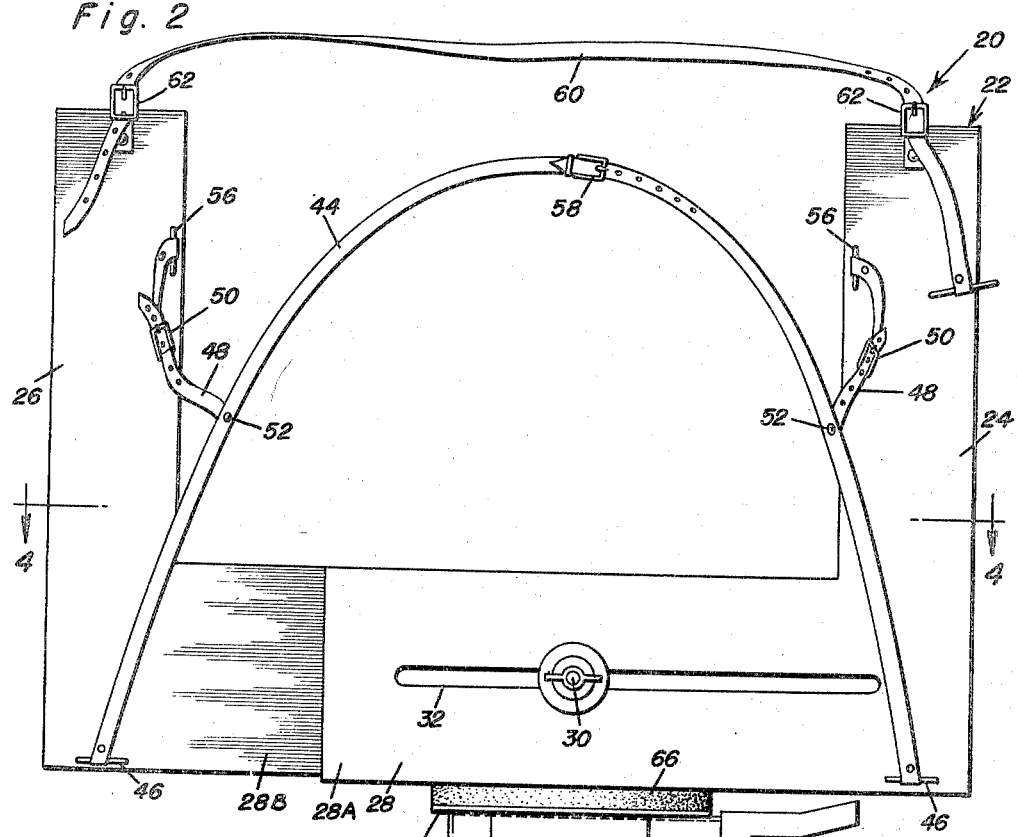
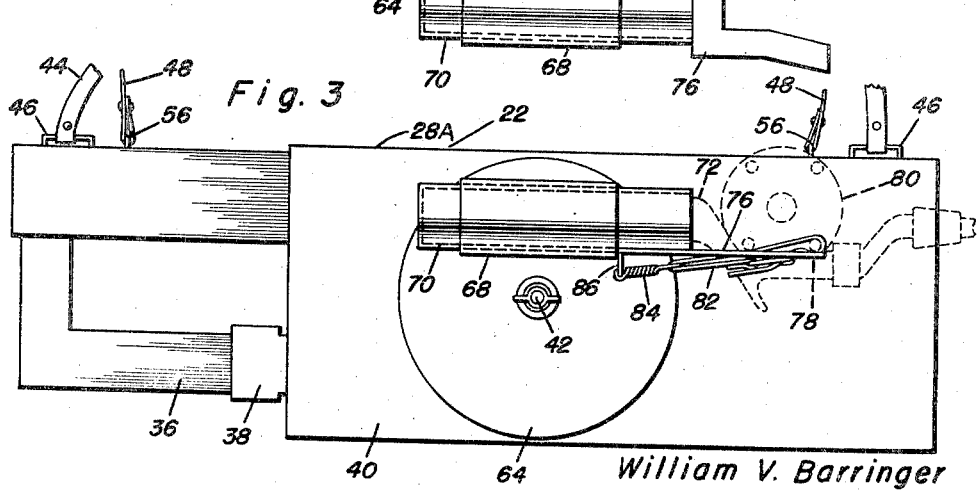
William V. Barringer
INVENTOR.
BY *Clarence A. O'Brien*
*and Harvey B. Jacobson*
Attorneys May 31, 1955      W. V. BARRINGER      2,709,544
ROD AND REEL HOLDER
Filed Nov. 3, 1952      3 Sheets-Sheet 3
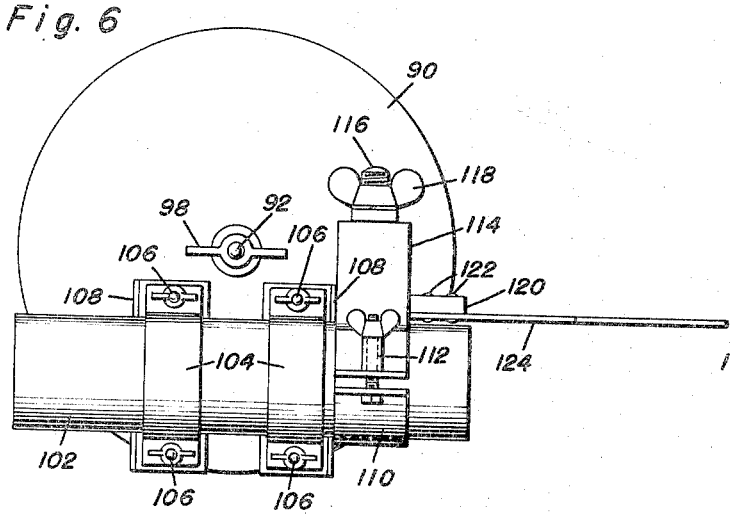
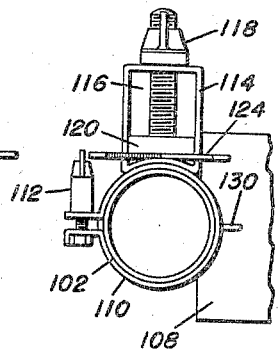
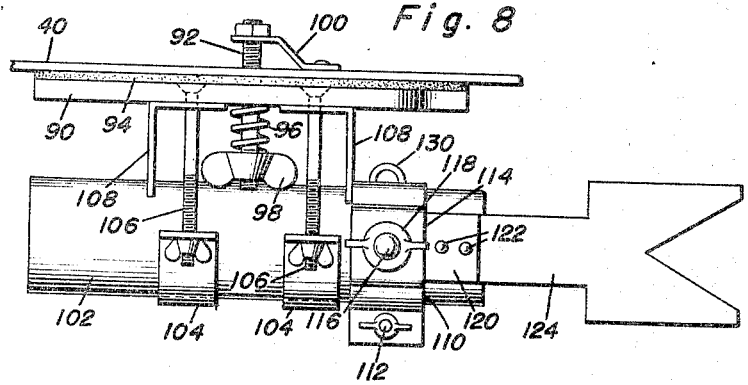
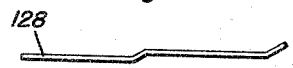
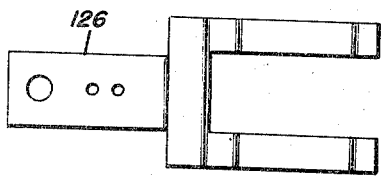
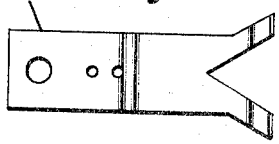
William V. Barringer
INVENTOR.

United States Patent Office 2,709,544
Patented May 31, 1955

2,709,544

ROD AND REEL HOLDER

William V. Barringer, Martinsburg, W. Va.

Application November 3, 1952, Serial No. 318,419

3 Claims. (Cl. 224—5)

This invention relates to new and useful improvements in structural refinements in fishing devices, and the principal object of the invention is to provide an apparatus for conveniently holding and effectively manipulating a fishing rod and reel.

In particular, the invention is primarily intended for use by persons having only one arm. An important feature of the invention resides in the provision of means for supporting the entire apparatus at the waist of the user by means of a shoulder engaging harness, whereby the rod and reel may be supported on the user's body and manipulated by only one hand.

Another feature of the invention resides in its convenient adjustability to accommodate different users, and also to accommodate left handed or right handed persons.

Some of the advantages of the invention lie in its simplicity of construction, in its efficient operation and in its adaptability to economical manufacture.

With the above more important objects and features in view, and such other objects and features as may become apparent in this specification proceeds, the invention consists essentially of the arrangement and construction of parts as illustrated in the accompanying drawings, in which:

Figure 1 is a perspective view of the invention in use;

Figure 2 is a top plan view of the invention per se;

Figure 3 is a side elevational view thereof;

Figure 4 is a sectional view, taken substantially in a plane of the line 4—4 of Figure 2;

Figure 5 is a sectional detail, taken substantially in a plane of the line 5—5 in Figure 4;

Figure 6 is a side elevational view of a modified form of the disc, fishing rod receiving socket and reel engaging clamp used in the invention;

Figure 7 is an end view of the socket and clamp shown in Figure 6;

Figure 8 is a top plan view of the mechanism shown in Figure 6;

Figures 9 and 10 are edge views of two modified forms of the reel clamps; and

Figures 11 and 12 are top plan views of the respective clamps shown in Figures 9 and 10.

Like characters of reference are employed to designate like parts in the specification and throughout the several views.

Referring now to the accompanying drawings in detail, more particularly to Figures 1-5 inclusive, the rod and reel holder is designated generally by the reference character 20 and embodies in its construction a horizontally disposed, substantially U-shaped supporting frame 22 including a front portion 24, a rear portion 26 and a bight portion 28 which connects the front and rear portions, as is clearly shown in Figure 2.

The frame 22 is adapted to be positioned at the waist of the user as shown in Figure 1, and the bight portion 28 is preferably formed from two complemental, slidably telescoped sections 28A and 28B, the latter carrying a fastening element 30 which extends through a slot 32 in the section 28A, so that the distance between the front and rear portions 24, 26, of the frame may be increased or decreased in accordance with the size of the user's body.

The sections 28A, 28B, are provided with downwardly extending members 34, 36, respectively, which are mutually overlapped and slidably connected together by complemental guides 38 with which these members are equipped.

It will be also observed that the section 28A of the bight portion 28 is also provided with a downturned vertically disposed flange 40 carrying a horizontal pivot element 42, the purpose of which will be hereinafter disclosed.

The frame 22 is supported at the waist of the user by a harness including a shoulder strap 44 which is connected at the ends thereof to suitable loops 46 provided at the front and rear frame portions 24, 26, adjacent the bight portion 28, and auxiliary straps 48, equipped with adjusting buckles 50, are connected to intermediate portions of the shoulder strap 44 as indicated at 52, and are anchored to loops 56 on the frame portions 24, 26, adjacent the open side of the frame. The shoulder strap 44 itself is provided with an adjusting buckle 58, and the open side of the frame is provided with a keeper strap 60, having adjusting buckles 62 at both ends thereof connected to the free ends of the frame portions 24, 26, as is clearly shown in Figure 2. It will be apparent that the length of the strap 60 may be adjusted in the buckles 62 in accordance with the spacing of the frame portions 24, 26, as controlled by the adjusting means 30, 32.

The aforementioned pivot element 42 on the flange 40 carries a rotatable disc 64 and a resilient disc 66 is interposed between the disc 64 and flange 40, so as to resist rotation of the disc 64. These frictional tensioning means may be adjusted by simply tightening or loosening the pivot element 42.

A U-shaped channel 68 is secured to the outer surface of the disc 64 and has mounted therein a tubular socket 70 which is adapted to removably receive the handle 72 of a fishing rod 74. Moreover, a fork-shaped clamp 76 is secured to the socket 70 and is adapted to engage the usual studs 78 of the housing of the reel 80. Also, a strap 82 may be passed around one of these studs (see Figure 3) and connected by a spring 84 to a loop 86 on the socket 70 for the purpose of sustaining the entire rod in position in the socket.

As is clearly shown in Figure 1, when the invention is placed in use, the apparatus is positioned at the waist of the user who, by the use of only one hand, may conveniently manipulate the reel as well as swing the entire rod, the latter movement being possible by the rotatability of the disc 64. It will also be observed that the apparatus may be positioned on the body of the user from either side, so that it may be operated by either the right or left hand.

Referring now to the modified embodiment of the invention shown in Figures 6-12 inclusive, the rotatable disc herein is designated by the reference character 90 and is pivotally mounted by means of a stud 92 on the aforementioned flange 40 of the supporting frame. A resilient disc 94 is interposed between the flange 40 and the disc 90 to resist rotation of the latter, and in addition, rotation of the disc 90 is resisted by a compression spring 96 which is placed on the stud 92 and is urged by a wing nut 98 against the disc 90. The stud 92 is rigidly supported on the flange 40 by an offset bracket 100 which is secured to the rear surface of the flange.

The fishing rod receiving socket 102 is removably supported on the disc 90 by a pair of clamps 104 which are positioned on pairs of studs 106 carried by the disc 90.

The studs 106 together with the clamps 104 sustain the socket 102 in a pair of angle brackets 108 which are secured to the disc 90 and provide seat for the socket 102.

A clamp assembly 110, equipped with a clamping screw 112, is mounted on the socket 102 and is provided with an upwardly extending yoke 114. This yoke accommodates a clamping screw 116, actuated by a nut 118. The screw 116 is engageable with a block 120 which is secured by rivets 122 to a reel engaging and sustaining member 124, similar to the aforementioned member 76.

By loosening the nut 118 on the clamping screw 116, the member 124 together with the block 120 may be removed and substituted by similar other members 126 or 128, as shown in Figures 9–12. The members 76, 126, 128, are differently configurated so as to facilitate proper engagement thereof with different reels.

If desired, an eye 130 may be fastened to the clamp 110 to accommodate the spring 84 of the aforementioned strap 82.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What is claimed as new is as follows:

1. In a rod and reel holder, the combination of a supporting frame adapted to be positioned at the waist of a user, means on said frame for sustaining the same in position, a disc mounted on one side of the frame for rotation in a vertical plane, a fishing rod receiving socket provided on said disc, and reel engaging and sustaining means provided on said socket said frame being substantially U-shaped and disposed in a horizontal plane, together with a downturned flange provided on the bight portion of said frame, said disc being mounted on said flange and rotatable in a vertical plane parallel with said flange.

2. In a rod and reel holder, the combination of a substantially U-shaped supporting frame adapted to be positioned at the waist of a user and including a front portion, a rear portion and a bight portion connecting the front and rear portions at one side of the frame, an adjustable strap extending between the front and rear portions at the other side of the frame, a shoulder engaging harness provided on the frame for sustaining the same in position, a downturned flange provided on said bight portion, a disc mounted on said flange for rotation in a vertical plane, a fishing rod receiving socket provided on said disc, and reel engaging and sustaining means provided on said socket.

3. The device as defined in claim 2 together with a friction disc between said flange and first named disc for resisting rotation of said disc.

References Cited in the file of this patent

UNITED STATES PATENTS

| 1,198,202 | Drinkard | Sept. 12, 1916 |
| 1,985,985 | Gerline | Jan. 1, 1935 |
| 2,099,254 | Ballman | Nov. 16, 1937 |
| 2,598,021 | Schwanke | May 27, 1952 |

FOREIGN PATENTS

| 38,548 | Norway | Dec. 10, 1923 |